(12) United States Patent
Lee

(10) Patent No.: US 6,654,874 B1
(45) Date of Patent: Nov. 25, 2003

(54) MICROCOMPUTER SYSTEMS HAVING COMPRESSED INSTRUCTION PROCESSING CAPABILITY AND METHODS OF OPERATING SAME

(75) Inventor: Yun-Tae Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/536,435

(22) Filed: Mar. 27, 2000

(30) Foreign Application Priority Data

Mar. 27, 1999 (KR) .............................. 99-10693

(51) Int. Cl.⁷ .............................. G06F 9/30; G06F 9/22
(52) U.S. Cl. ...................... 712/209; 712/213; 712/210; 712/300; 712/41
(58) Field of Search .................... 712/223, 209, 712/213, 210, 224, 300, 41, 24; 708/714; 395/240.02, 240.14

(56) References Cited

U.S. PATENT DOCUMENTS

| | | | |
|---|---|---|---|
| 5,117,488 A | 5/1992 | Noguchi et al. ............ 395/375 |
| 5,249,273 A | 9/1993 | Yoshitake et al. .......... 395/375 |
| 5,293,592 A | 3/1994 | Fu et al. ....................... 395/375 |
| 5,576,765 A * | 11/1996 | Chenney et al. ............ 708/714 |
| 5,621,907 A | 4/1997 | Watanabe ................... 395/383 |
| 5,630,085 A | 5/1997 | Watanabe ................... 395/383 |
| 5,784,585 A * | 7/1998 | Denman ..................... 712/209 |
| 5,922,067 A | 7/1999 | Nakayama .................. 712/208 |
| 5,935,237 A | 8/1999 | Chiba et al. ................... 712/42 |
| 5,966,514 A | 10/1999 | Matsuzaki et al. .......... 395/386 |
| 6,016,543 A | 1/2000 | Suzuki et al. ............... 712/233 |

OTHER PUBLICATIONS

Ting et al., "MuP21—A High Performance MISC Processor", Offete Enterprises, Inc., Mar. 17, 1995, www.ultratechnology.com/mup21.html, 5 pages.

Advanced RISC Machines, ARM 7TDMI Data Sheet, Document No.: ARM DDI 0029E, Issued Aug. 1995, 16 pages.

* cited by examiner

*Primary Examiner*—Daniel H. Pan

(57) ABSTRACT

Microcomputer systems include an instruction processor therein that can process both normal length instructions and compressed instructions. The normal length instructions and the compressed instructions are provided from memory to an instruction register and then passed through decoding circuitry to a processor core. The decoding circuitry preferably comprises a demultiplexer having a data input that receives a first multi-bit instruction from the instruction register and a select input that receives a first select signal (SEL1). A compressed instruction decoder is also provided. The compressed instruction decoder has a data input electrically coupled to a first data output of the demultiplexer and a select input that receives a second select signal (SEL2). A multiplexer is also provided. The multiplexer has a first data input electrically coupled to an output of the compressed instruction decoder, a second data input electrically coupled to a second data output of the demultiplexer and a select input that receives the first select signal (SEL1). The output of the demultiplexer is electrically coupled to the processor core.

11 Claims, 5 Drawing Sheets

MICROCOMPUTER SYSTEMS HAVING COMPRESSED INSTRUCTION PROCESSING CAPABILITY AND METHODS OF OPERATING SAME

RELATED APPLICATION

This application is related to Korean Application No. 99-10693, filed Mar. 27, 1999, the disclosure of which is hereby incorporated herein by reference.

FIELD OF THE INVENTION

The present invention relates to digital data processing systems and, more particularly, to microcomputer systems for processing both compressed and uncompressed instructions.

BACKGROUND OF THE INVENTION

Today, the computer industry is continuing to be revolutionized by the advances made in integrated-circuit technology. Particularly, single integrated circuit (IC) computers or microcomputers are rapidly advancing. The heart of a microcomputer system is a microprocessor which is usually a general-purpose processor built into a single IC chip. A microprocessor is an example of very large scale integration (VLSI) devices. The use of VLSI circuitry microprocessors (or microcomputers) have brought the benefits of smaller size, lighter weight, lower cost, reduced power requirements, and higher reliability.

Typical microprocessors, such as Intel x86 families and Motorola M68000 series, are known for their abundant instruction sets, multiple addressing modes, and multiple instruction formats and sizes. Their control is micro-programmed, and different instructions are executed within a different number of cycles. The control units of such microprocessors are naturally complex, since they have to distinguish between a large number of op-codes, addressing modes, and formats. This type of system belongs to the category called Complex Instruction Set Computer (CISC). A CISC processor system with a large menu of features typically requires a larger and more complicated decoding subsystem, preceding the complex control logic. Logic signals will usually have to propagate through a considerable number of gates, increasing the duration of delays and slowing down the system. In such a micro-programmed environment, increased complexity will directly result in longer micro-routines and therefore their longer execution to produce all necessary micro-operations and their corresponding control signals to execute an instruction.

One of the ways to increase the speed of execution on any computer is to implement pipelining. An n-stage pipelined system deals with n subsequent instructions simultaneously so that pipelining can improve significantly system performance. For many years pipelining has been implemented in numerous CISC systems. Many CISC systems, however, execute their instructions in more than one system clock cycle because of their complexity and memory access for operands during execution. To efficiently handle a pipeline, it may be necessary to enable a computer system to fetch an instruction in a single system clock cycle, and then execute it in a cycle. This requirement can easily be met in Reduced Instruction Set Computer (RISC) design approach.

In recent RISC-type processors, like SPARC, MIPS, and Alpha from DEC, PA from HP, PowerPC from IBM, i860 from Intel, practically everything (e.g., the number of instructions, addressing modes, and formats) is reduced. In such RISC processors, all instructions may have the same size and almost all of them may be executed within a single clock cycle.

With the uniform instruction size in RISC systems, all of the instructions can be fetched in a clock cycle. Because of RISC simplicity and restricted memory access, most RISC instructions are executed in a single cycle. Therefore, RISC systems can handle pipelining more efficiently than CISC systems. In general, it is very important to determine optimal instruction size upon designing microcomputer systems since the size directly affects system performance and power consumption.

When a system has a larger instruction size than a normal instruction size (e.g. system data bus width), performance of the system can be degraded because an instruction must be fetched more than twice through its system data bus, that is, due to the bottleneck of instruction fetch. A smaller instruction size than the normal instruction size can also cause the deteriorated system performance because for example, the number of registers to access at a time and the size of immediate data to be used for jump and arithmetic instructions are limited.

Considering system performance, it would be desirable to make data bus width equal to or larger than the instruction size but on the other hand, it will increase system power consumption. In the meantime, some other applications pursuing only performance will require instructions and data buses as wide as possible in order to greatly profit from such architectures regardless of power consumption. These are usually called Very Large instruction Word (VLIW) architectures. These architectures consume large amounts of power on the whole since they need larger size data buses and cache memories.

Some other applications will require instructions and data buses as narrow as possible to allow efficient operation with minimal instructions. These are usually called Minimal Instruction Set Computer (MISC) architectures. These architectures consume small amounts of power on the whole since they need smaller size data buses and cache memories. A technique of the MISC architectures is set forth in "MuP21—High Performance MISC Processor", by Charles Moore and C. H. Ting, January 1995 issue of Forth Dimensions.

Accordingly, instruction size of microcomputers should be determined by considering its several parameters such as performance, power consumption, and applications. Examples of RISC processors, having been developed With such design targets, include SuperH (SH 7000) series from Hitachi and ARM7TDMI from Advanced RISC Machines Ltd. (ARM). The SH series microcomputer is a RISC processor for processing 32-bit data with 16-bit instructions. The processor has an efficient architecture composed of optimal instruction set. However, because of the short length of the instructions of the processor, it is hard to compose the instruction for improving performance of the processor. In addition, advantages obtained from the architecture of 32-bit microcomputer are restricted.

The ARM7TDMI processor employs an architectural strategy known as Thumb. The ARM7TDMI processor has two types of instruction sets, such as standard 32-bit ARM sets and 16-bit Thumb sets. A 16-bit instruction set is processed in a so-called Thumb mode, in which a 16-bit instruction is first converted into a 32-bit one and then the 32-bit instruction is performed in practice. An immediate data for a 32-bit instruction is assigned to 12-bit (having address space of 4K bytes), but one for a 16-bit instruction is restricted to 8-bit (having address space of 256 bytes). In the Thumb mode, if the branch space of a 16-bit instruction exceeds 256 bytes, then it has to be performed more than once so that the processor performance will be decreased. The more detailed architecture is described in "ARM7DMI Data Sheet", which is available at www.arm.com As described above, in spite of high-performance, the VLIW architecture may consume too much power, but the application of the MISC architecture may be restricted within limited applications. In addition, the above 32-bit processors having only 16-bit instructions, such as the SH series from Hitachi, may have structural weakness on account of its instruction length. Further, the above 32-bit processors supporting both 16-bit and 32-bit instructions, such as the ARM7TDMI from ARM, may suffer from pipeline stalls due to its different instruction lengths.

SUMMARY OF THE INVENTION

Embodiments of the present invention comprise a microcomputer having a preferred instruction processor therein that can process both normal length instructions and compressed instructions. According to preferred aspects of these embodiments, the normal length instructions and the compressed instructions are provided from memory to an instruction register and then passed through decoding circuitry to a processor core. The decoding circuitry preferably comprises a demultiplexer having a data input that receives a first multi-bit instruction from the instruction register and a select input that receives a first select signal (SEL1). A compressed instruction decoder is also provided. The compressed instruction decoder has a data input electrically coupled to a first data output of the demultiplexer and a select input that receives a second select signal (SEL2). A multiplexer is also provided. The multiplexer has a first data input electrically coupled to an output of the compressed instruction decoder, a second data input electrically coupled to a second data output of the demultiplexer and a select input that receives the first select signal (SEL1). The output of the demultiplexer is electrically coupled to the processor core.

Based on this configuration of the decoding circuitry, a first select signal having a first logic value (e.g., logic 1) can be used to enable a normal length instruction to be passed directly from the second output of the demultiplexer to the second data input of the multiplexer and then to the processor core. Alternatively, a first select signal having a second logic value (e.g., logic 0) can be used to enable a compressed instruction to be passed from the first output of the demultiplexer to the compressed instruction decoder. The output of the compressed instruction decoder is then passed to the first input of the mutiplexer and then to the processor core. The processor core may generate the first and second select signals.

Embodiments of the present invention may also include methods of operating compressed instruction decoders. These methods preferably include the steps of decoding a first compressed instruction (within a multi-instruction word) as a first multi-bit operand and decoding a second compressed instruction (within the multi-instruction word) as a first address of a memory array containing a plurality of instructions (e.g., a plurality of first type instructions having operands and a plurality of second type instructions which do not have operands). These methods may also include simultaneously providing a first instruction, which is stored at the first address within the memory array, and the first multi-bit operand in parallel to an output of the compressed instruction decoder. Each of the compressed instructions that are provided to the compressed instruction decoders may include information as to how the respective compressed instruction is to be decoded. For example, for a compressed instruction having a length of 8 bits, the two most significant bits may be used as select inputs to a 1-to-4 demultiplexer which selectively passes the compressed instruction as an operand or as an address of a memory array containing instructions, for example.

Embodiments of the invention may also include methods of operating instruction processors. These methods may comprise the steps of transferring a first M-bit instruction within a first memory device to a processing device that performs operations defined by the first M-bit instruction and transferring a second M-bit instruction within the first memory device to a compressed instruction decoder. Steps are also performed to decode first and second compressed instructions (within the second M-bit instruction) as a first address within a second memory device and as a first operand, respectively. A third M-bit instruction located at the first address within the second memory device may then be transferred to the processing device. Thus, the first compressed instruction may be decoded and used to retrieve an M-bit (e.g., normal length) instruction. This M-bit instruction may then be passed to the processing device. These methods may also include steps to transfer a fourth M-bit instruction within the first memory device to the compressed instruction decoder and then decode third and fourth compressed instructions (within the fourth M-bit instruction) as a second address within the second memory device and as a second operand, respectively. Next, an N-bit instruction (where N<M) located at the second address within the second memory device and the second operand may be transferred to a M-bit register. The N-bit instruction and the second operand may then be transferred in parallel from the M-bit register to the processing device.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein.

Figure 1:
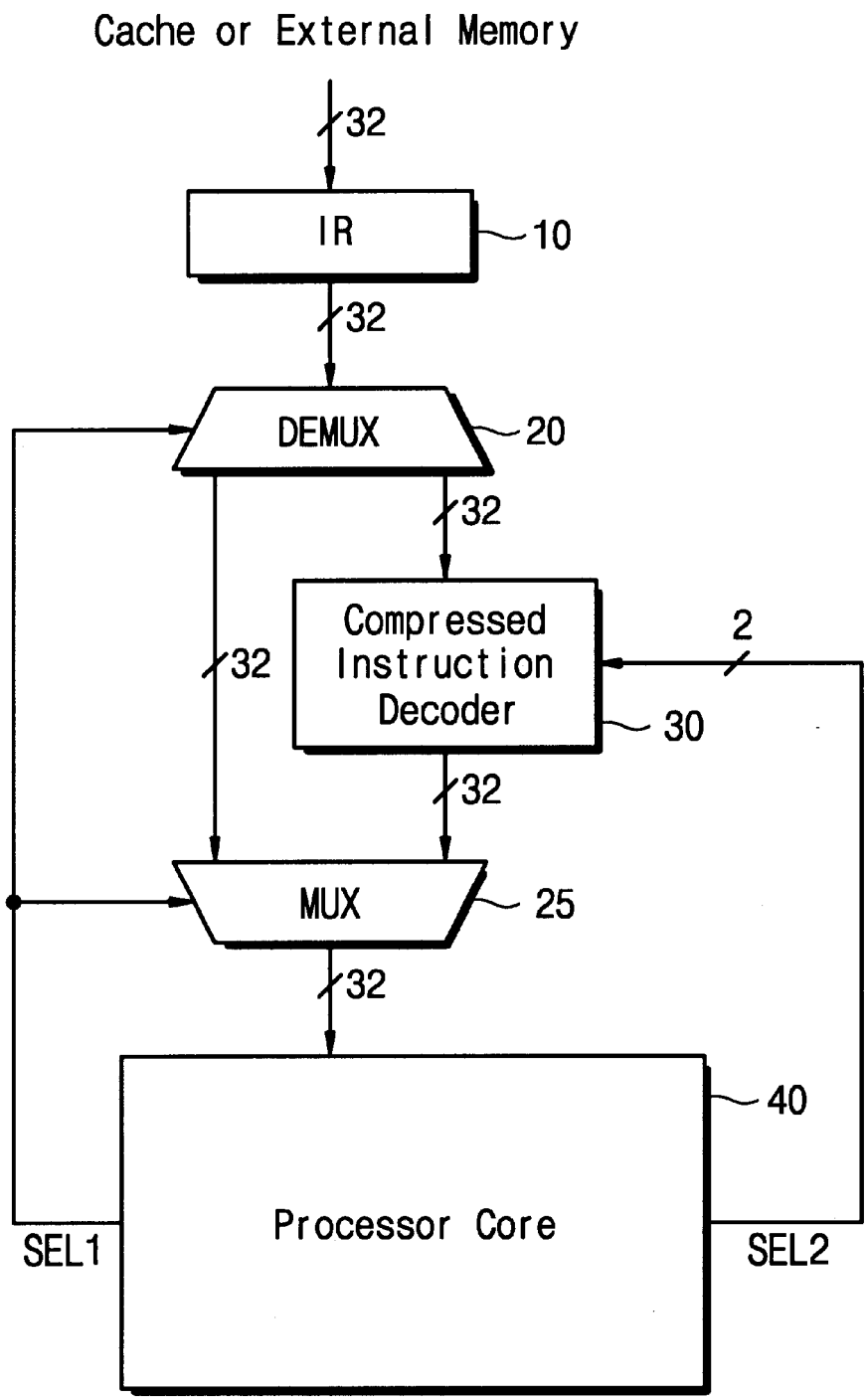
FIG. 1 is a block diagram of a microcomputer according to a first embodiment of the present invention.

FIG. 1 is a schematic block diagram for illustrating a structure of a microcomputer according to a preferred embodiment of the present invention. Referring to FIG. 1, the microcomputer comprises an instruction register (IR) 10, a first demultiplexer (DEMUX) 20, a first multiplexer (MUX) 25, a compressed instruction decoder 30, and a processor core 40. The instruction register 10 receives either a 32-bit normal instruction or four 8-bit compressed instructions from an internal instruction cache (not shown) or an external memory (not shown). An input terminal of the first demultiplexer 20 is coupled to the instruction register 10. A first output terminal of the first demultiplexer 20 is coupled to an input terminal of the first multiplexer 25, and a second output terminal is coupled to an input terminal of the compressed instruction decoder 30. An output terminal of the compressed instruction decoder 30 is coupled to another input terminal of the first multiplexer 25. An output of the first multiplexer 25 is provided for the processor core 40. The processor core 40 is composed of a plurality of functional circuits for a microcomputer. The processor core 40 provides a first selection signal SEL1 for the first demultiplexer 20 and the first multiplexer 25, and a second selection signal SEL2 for the compressed instruction decoder 30.

The microcomputer composed of these elements has a normal instruction mode and a compressed instruction mode as two operation modes. In the normal instruction mode, the normal instruction from the instruction register 10 is input to the processor core 40 through the first demultiplexer 20 and the first multiplexer 25. In the compressed instruction mode, the compressed instructions from the instruction register 10 are input to the compressed instruction decoder 30 through the first demultiplexer 20. The compressed instruction decoder 30 sequentially decodes the compressed instructions, and provides the decoded compressed instructions for the processor core 40 in response to the second selection signal SEL2 from the processor core 40. The second selection signal SEL2 is used for determining the order in which the compressed instructions are provided in sequence to the processor core. The processor core 40 generates the first selection signal SEL1 to the first demultiplexer 20 and the first multiplexer 25 in response to the operation modes of the microcomputer, and generates the second selection signal SEL2 to the compressed instruction decoder 30 during the compressed instruction mode.

In one embodiment, each compressed instruction is an 8-bit instruction. In the compression mode, four compressed instructions are fetched to the instruction register 10 at one time. The fetched compressed instructions are input to the compressed instruction decoder 30 through the first demultiplexer 20 and then decoded. The respective decoded 32-bit instructions are input to an instruction decoder (not shown) included within the processor core 40 through the first multiplexer 25. The operation of the compressed instruction decoder 30 will now be described in detail.

Figure 2:
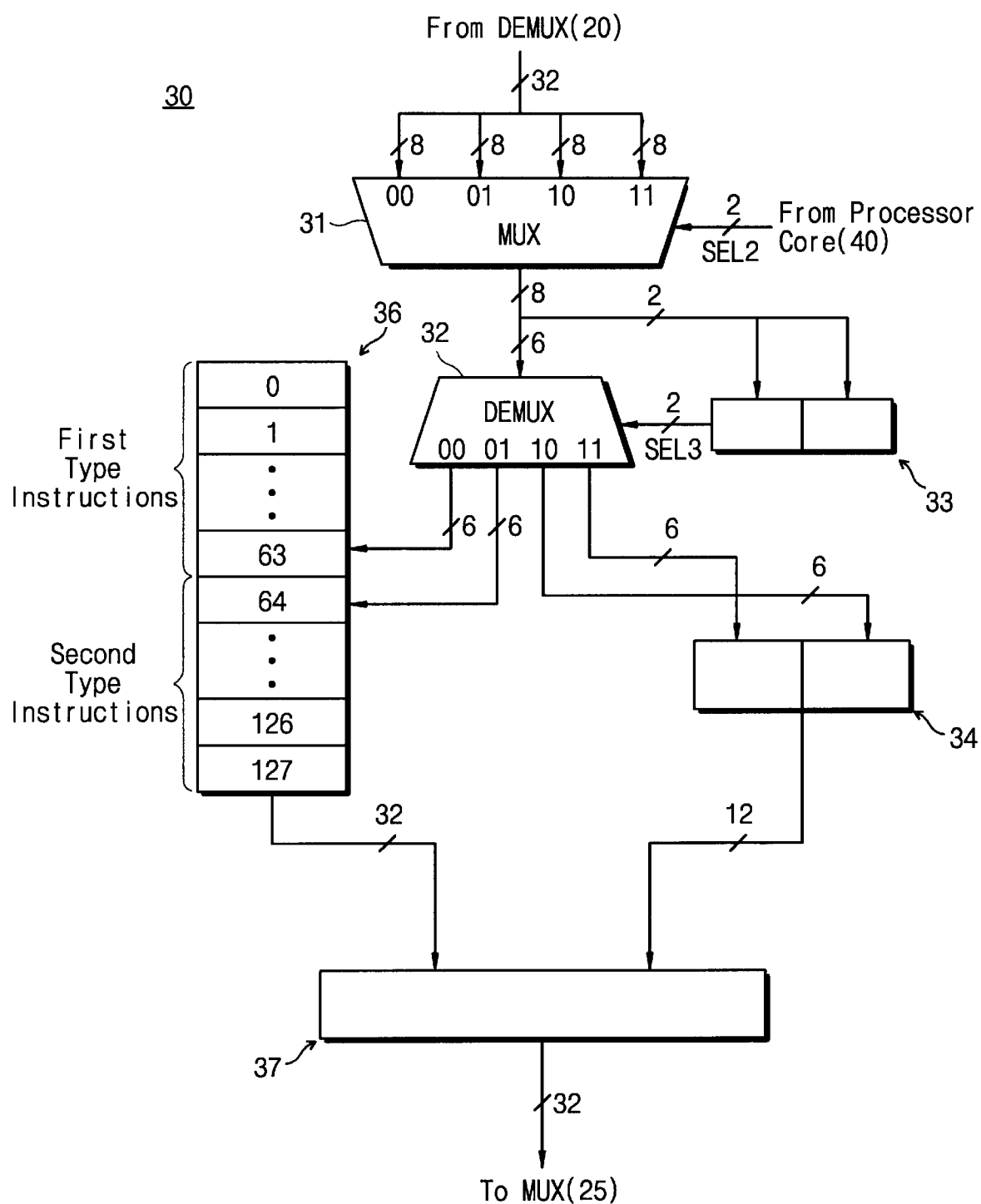
FIG. 2 is a block diagram of a preferred compressed instruction decoder according to the embodiment of FIG. 1.

FIG. 2 is a detailed block diagram for illustrating a preferred compressed instruction decoder 30, as shown in FIG. 1. The compressed instruction decoder 30 includes a second multiplexer 31, a second demultiplexer 32, a first register 33, a second register 34, a memory array (including row decoder) 36 and a third register 37.

In the memory array 36, 128 frequently used instructions are stored. According to a preferred embodiment of the present invention, the number of the instructions may be restricted to 128, but the number of instructions can be increased or decreased with changes in size of the memory array. The memory 36 may be a read only memory (ROM), a random access memory (RAM), an erasable programmable read only memory (EPROM), an electrically erasable and programmable ROM (EEPROM) or a flash memory, for example. The instructions stored in the memory 36 can be updated or can be fixed in manufacturing of the microcomputer by using the ROM. In that case, the instructions being stored in the memory 36 are predetermined by selecting frequently used instructions through a stochastic method, or predetermined by a user, for example. The former can fix the 128 instructions by constructing the memory as a ROM or a hardwired random logic. The latter can update the instructions every time it is used, and which is capable of downloading corresponding instructions to the memory 36 before the normal operation of the microcomputer.

The instructions stored in the memory 36 can be classified as either of two types. A first type comprises instructions which do not require the additional specification of an immediate data or a register. The first type of instructions may include operands or may not require operands. In that case, the first type instructions may be 32 bits long. Second type instructions comprise instructions where the specification of the immediate data or the register is required. The second type of instructions may be 20 bits long.

As described above, the length of the first instruction may be 32 bits long and the length of the second instruction may be 20 bits long according to the preferred embodiment of the present invention. However, although the data width of the bus between the memory 36 and the third register 37 is illustrated to 32 bits, the length of the instructions are changeable by the characteristics of the microcomputer system.

In the compressed instruction mode, the second multiplexer 31 receives four 8-bit compressed instructions from the instruction register 10, and outputs the instructions selectively, in response to the 2-bit second selection signal SEL2 from the processor core 40. The 2-bit second selection signal SEL2 may be the lower 2-bits output from a program counter (not shown) included in the processor core 40. In that case, if the number of the compressed instruction is N, the second selection signal SEL2 is composed of $\log_2$ Nbits. The selected 8-bit compressed instruction is input to the second demultiplexer 32. At this time, the most significant 2 bits of the compressed instruction from the second multiplexer 31 is input to the first register 33. The 2-bit data is used as a third selection signal SEL3 for the second demultiplexer 32.

The 8-bit compressed instructions are classified based on the values of their two most significant bits. For example, if two most significant bits of the compressed instructions (i.e., the third selection signal SEL3) are '00' or '01', the compressed instruction composed of the remaining least significant 6 bits is used for indicating the row address of the first or the second type of instruction stored in the memory 36. If the most significant bits of the compressed instruction are '00' or '01', the compressed instruction from the second multiplexer 31 is input to the memory 36 as a row address (through the second demultiplexer 32).

Alternatively, if the two most significant bits of the compressed instruction (i.e., third selection signal SEL3) are '10' or '11', the lower 6-bits of these instructions are used for specifying the immediate data or specifying the register. In particular, the compressed instruction is used as an operand for the second type of instruction stored in the memory 36. In this case, the lower 6-bits of the compressed instruction from the second multiplexer 31 is input to the second register 34 (through the second demultiplexer 32) as an operand for specifying the immediate data or the register.

More particularly, if the two most significant bits of the compressed instruction are '10', its lower 6-bits is input to the lower 6-bits of the second register 34 through the second demultiplexer 32. If the two most significant bits of the compressed instruction are '11', its lower 6-bits are input to six most significant bits of the second register 34 (through the second demultiplexer 32). As a result, the 12-bit data of the second register 34 is output to the third register 37 as an operand for specifying the immediate data or the register of an instruction to be executed. Generally, RISC instructions specify three registers, and each register requires a 4-bit field.

As described above, if the two most significant bits of the compressed instruction are '00' or '01', the compressed instruction from the second multiplexer 31 is input to the memory 36 as a row address (through the second demultiplexer 32).

For example, if the two most significant bits of the compressed instruction is '00', the six least significant bits of the compressed instruction from the second multiplexer 31 indicates an address of an instruction that requires specifying neither the immediate data nor a register (i.e., the first type instruction), the instruction in the memory array 36 corresponds to a 32-bit instruction. In that case, the 32-bit instruction is read out from the memory 36 and the instruction is output to the third register 37. The instruction stored in the third register 37 is then transferred to the processor core 40 through the first multiplexer 25.

However, if the two most significant bits of the compressed instruction is '01', the six least significant bits of the compressed instruction from the second multiplexer 31 indicates an address of an instruction that requires the specification of immediate data or a register (i.e., the second type instruction), the instruction in the memory array 36 corresponds to a 20-bit instruction. In that case, the 20-bit instruction is read out from the memory 36 and the instruction is stored to the 20 most significant bits of the third register 37. At this time, the 12-bit operand data stored in the second register 34 is input to the 12 least significant bits of the third register 37. The 20-bit instruction and the 12-bit operand data are combined in the third register 37. The combined instruction is input to the processor core 40 through the first multiplexer 25.

As described above, the instruction from the memory 36 and/or the operand data from the second register 34 is input to the third register 37, and the output of the third register 37 is input to the processor core 40 through the first multiplexer 25. An instruction decoder (not shown) included within the processor core 40 decodes the instruction from the first multiplexer 25. It may be helpful to arrange the 128 instructions in the memory 36. For example, the first type instructions may be stored in the row addresses 0–63 of the memory 36, and the second type instructions may be stored in the row addresses 64–127 of the memory 36.

Figure 3:
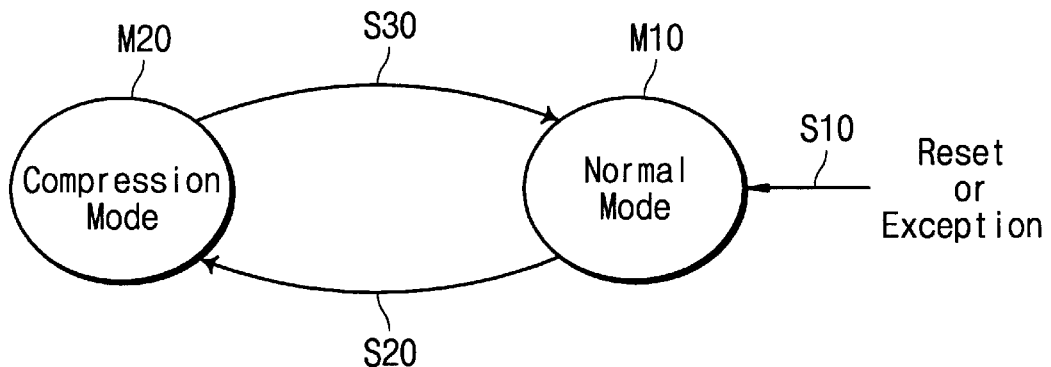
FIG. 3 is a state diagram that illustrates operation of the microcomputer of FIG. 1 when processing instructions in normal and compressed mode.

FIG. 3 is a state diagram for illustrating operation modes of the microcomputer shown in FIG. 1. Referring to FIG. 3, the microcomputer operates in a normal mode M10 and a compression mode M20. The normal mode M10 is a mode for processing 32-bit uncompressed normal instructions, the compression mode M20 is a mode for processing the compressed instructions. When the microcomputer is reset or an exception handling requirement such as an interrupt (refer to S10) is input, the microcomputer is operated in the normal mode. If an instruction for converting the operation mode from the normal mode M10 to the compression mode M20 is input, the operation mode of the microcomputer is converted to the compression mode (refer to S20). In addition, if an instruction for converting the operation mode from the compression mode M20 to the normal mode M10 is input (or the exception handling requirement such as the interrupt is input while the microcomputer is operated in the compression mode M20), the operation mode of the microcomputer is converted to the normal mode M10 (refer to S30). According to the preferred embodiment, the operation mode of the microcomputer is converted to the normal mode M10 when the exception handling requirement occurs. However, if the exception handling requirement is composed of the compressed instruction, the exception handling requirement can be executed in the compression mode.

Figure 4:
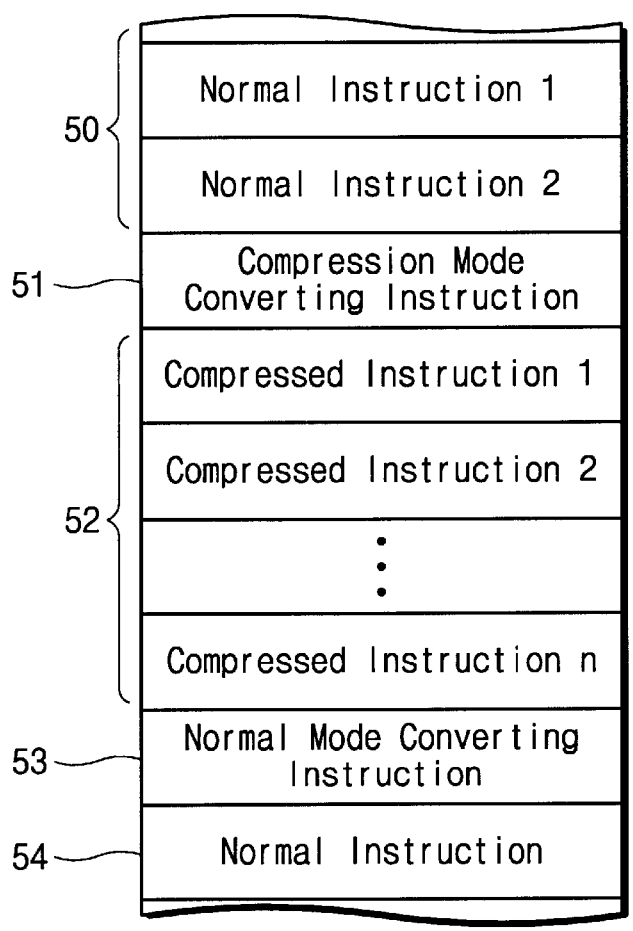
FIG. 4 illustrates a stream of normal and compressed mode instructions that can be processed by the microcomputer of FIG. 1.

FIG. 4 is a diagram for illustrating an example of a stream of instructions for converting the operation mode of the microcomputer shown in FIG. 1. Referring to FIG. 4, a compression mode converting instruction 51 for converting the normal mode to the compression mode, and a normal mode converting instruction 53 for converting the compression mode to the normal mode, are provided to the microcomputer. The compression mode converting instruction 51 is located between one or more normal instructions 50 and one or more compressed instruction 52, and the normal mode converting instruction 53 is located between one or more compressed instructions 52 and one or more normal instructions 54. The compression mode converting instruction 51 is a 32-bit instruction, and the normal mode converting instruction 53 is an 8-bit instruction.

The processor core 40 executes the normal instruction 50 during the normal mode, and executes the compressed instruction 52 after inputting the compression mode converting instructions 52. At this time, the processor core 40 generates the first selection signal SEL1 corresponding to the compression mode to the first demultiplexer 20 and the first multiplexer 25. The processor core 40 generates the first selection signal SEL1, to provide the compressed instructions from the instruction register 10 to the compressed instruction decoder 30 through the first demultiplexer 20, and to provide the decoded compressed instruction to the processor core 40 through the first multiplexer 25.

The processor core 40 executes the compressed instruction 52 during the compression mode, and executes the normal instruction 54 after inputting the normal mode converting instruction 53. In that case, the processor core 40 generates the first selection signal SEL1 to the first demultiplexer 20 and the first multiplexer 25, so as to provide the normal instruction from the instruction register 10 to the processor core 40 through the first demultiplexer 20 and the first multiplexer 25. It is desirable that the 'N+1' compressed instructions executed in the compression mode are composed of multiples of 4, by considering the arrangement of the data field and a simplification of the hardware.

As described above, in the normal mode, the 32-bit instructions fetched from the external memory (or the internal cache) to the instruction register 10 are input to the instruction decoder (not shown) of the processor core 40 through the first demultiplexer 20 and the first multiplexer 25. In the compression mode, the fetched compressed instructions are input to the compressed instruction decoder 30 through the first demultiplexer 20, and the decoded 32-bit instructions from the compressed instruction decoder 30 are input to the instruction decoder (not shown) of the processor core 40 through the first multiplexer 25.

In the compression mode, the microcomputer fetches 32 bits of data in every fetch operation. The respective fetched 32-bit data is composed of four 8-bit compressed instructions. In order to process four (4) instructions during the normal mode, four fetch operations are performed. Thus, the power consumed during compression mode is reduced because of the reduced number of fetch operations that are needed to process each instruction relative to the normal mode.

In the conventional microcomputer, the microcomputer detects whether the corresponding instruction is located in the internal instruction cache or not during an instruction fetch operation. If the corresponding instruction is located in the instruction cache (i.e., cache hit), the instruction is fetched to the instruction register 10. However, if the corresponding instruction is not located in the instruction cache (i.e., cache miss), the instruction is fetched from the external memory. During the instruction fetching operation from the external memory, the required instruction as well as the instructions located in adjacent addresses are loaded into the cache, so as to use a space locality of a program code. When the cache miss occurs, the long instruction is loaded to the cache several times, so that the performance loss and the current consumption of the microcomputer may be increased. For example, if the data bus size is 32-bit and the cache system is capable of loading four 32-bit instructions with the missed instruction (i.e., line size=4), fetch cycles for fetching four instructions occur four times through the data bus when the cache miss occurs. In that case, a conventional microcomputer does not operate during a cache line fill operation. Thus, the performance loss and the current consumption of the microcomputer are increased.

However, according to the present invention, if a cache miss occurs in the compression mode, four instructions are loaded to the 32-bit data bus at one time. Thus, the power consumption of the microcomputer can be reduced by a factor of four (4) and the cache memory can be used more efficiently. Further, the performance of the microcomputer is improved. The performance, the current consumption, and the cache efficiency of the microcomputer can be improved, if a hard limit is given to a high level language compiler at code generation in order to use the maximum of 128 instructions stored in the memory 36 in making a program for the microcomputer.

In a preferred embodiment, the compressed instruction decoder 30 is designed by considering the instructions which do not require the specification of immediate data and the register as well as the instructions which do require the specification of immediate data or the register. However, if the compressed instruction decoder 30 is designed by considering the instructions being not required to specify the immediate data and the register (i.e., the instructions which include the operands), the compressed instruction decoder 30 can be composed of the memory 36 and the second multiplexer 31. In that case, the compressed instructions from the second multiplexer 31 are used as addresses of the memory 36.

Figure 5A:
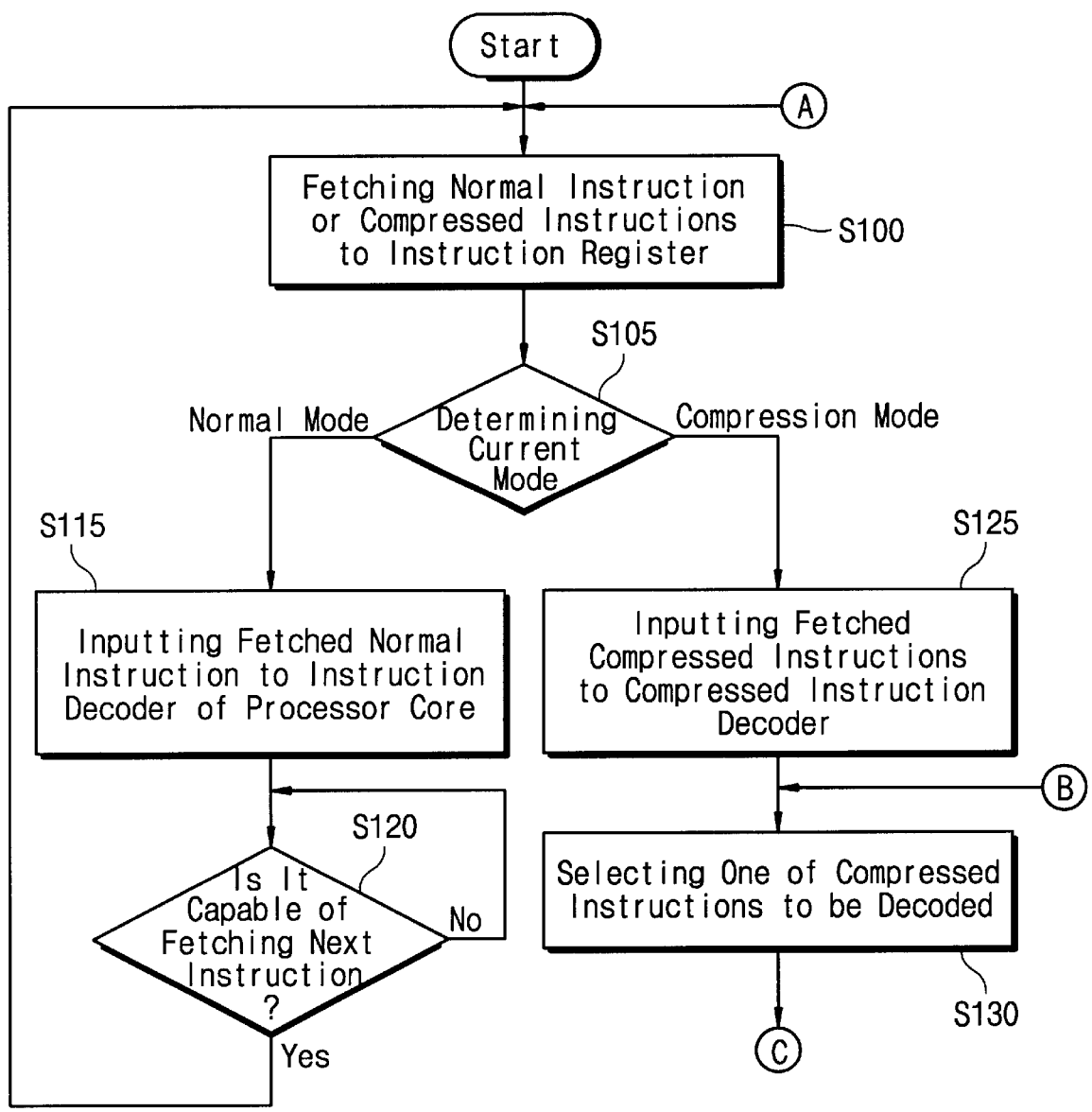
FIGS. 5A–5B are flow diagrams that illustrate operation of the microcomputer of FIG. 1 according to another embodiment of the present invention.
Figure 5B:
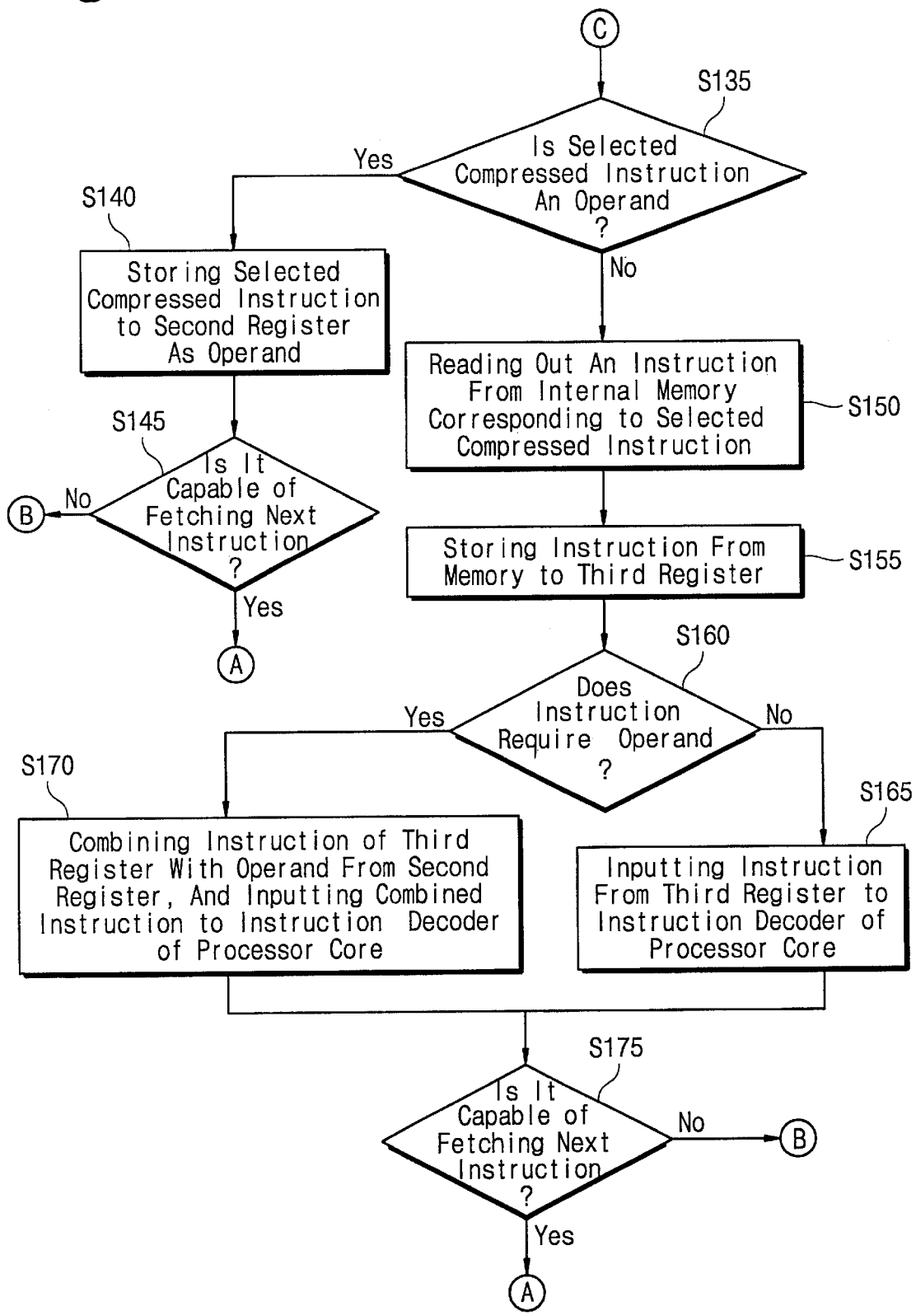

FIGS. 5A and 5B are flowcharts for illustrating operations of the microcomputer according to a preferred embodiment of the present invention. Referring to FIGS. 5A and 5B, at block S100, the microcomputer fetches the normal instruction or the compressed instructions to the instruction register 10. At block S105, the microcomputer determines the current operation mode of the microcomputer which is set to either normal mode or the compression mode. If the determined operation mode is the normal mode, the fetched normal instruction is input to the instruction decoder (not shown) of the processor core 40 in block S115, and the flow proceeds to block S120. At block S120, it is determined whether the next instruction is capable of being fetched or not. If so, the flow returns to block S100.

If the determined operation mode is the compression mode, the fetched compressed instructions are input to the compressed instruction decoder 30 in block S125. At block S130, one compressed instruction is selected among the compressed instructions. At block S135, it is determined whether the selected compressed instruction is the operand for specifying the immediate data or the register. As described above, the sort and the use of the compressed instruction is verified by the most significant two bits of the selected instruction.

If the selected compressed instruction is used for specifying the immediate data or the register, the flow proceeds to block S140, wherein the selected compressed instruction is stored to the second register 34 as an operand. More particularly, if the most significant two bits of the selected instruction are "10", the lower 6-bit of the compressed instruction is stored to the lower 6-bits of the second register 34, and if the most significant two bits of the selected instruction are "11", the lower 6-bits of the compressed instruction are stored to the high 6-bit of the second register 34. At block S145, it is determined whether the next instruction is capable of being fetched or not. If so, the flow returns to block S100, and if not, the flow returns to block S130.

If the selected instruction is not used for specifying the immediate data or the register (i.e., if the selected instruction is used as an address for appointing an instruction stored in the memory 36), the flow proceeds to block S150, wherein the instruction corresponding to the selected compressed instruction is read out from the memory 36. At block S155, the read out instruction is stored to the third register 37.

Next, at block S160, it is determined whether the instruction requires the operand. If not, the flow proceeds to block S165, wherein the instruction stored in the third register 37 is input to the instruction decoder (not shown) included in the processor core 40. If so, the flow proceeds to block S170, wherein the instruction stored in the third register 37 is combined with the operand stored in the second register 34, and the combined instruction is input to the instruction decoder (not shown) included in the processor core 40. Next, at block S175, it is determined whether the next instruction is capable of being fetched or not. If so, the flow returns to block S100, and if not, the flow returns to block S130.

As described above, the compressed instructions are used as addresses for indicating the instructions stored in the memory, and are used as operands for specifying an immediate data or a register. Thus, the instructions stored in the memory 36 can be executed by the compressed instructions. In addition, the microcomputer fetches a plurality of compressed instructions at one time in the compression mode, so that the fetching cycle can be reduced remarkably compared to the conventional microcomputer. Therefore, the performance of the microcomputer can be improved and the power consumption of the microcomputer can be reduced. Further, the microcomputer can be used with the small size internal cache, efficiently.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An instruction processor, comprising:
   a demultiplexer having a data input that receives a first multi-bit instruction and a select input that receives a first select signal;
   a compressed instruction decoder having a data input electrically coupled to a first data output of said demultiplexer and a select input that receives a second select signal;
   a multiplexer having a first data input electrically coupled to an output of said compressed instruction decoder, a second data input electrically coupled to a second data output of said demultiplexer and a select input that receives the first select signal; and a processor core that is configured to generate the first and second select signals.

2. The processor of claim 1, wherein said compressed instruction decoder generates a second multi-bit instruction; and wherein said processor core receives the first multi-bit instruction when the first select signal is in a first logic state and receives the second multi-bit instruction when the first select signal is in a second logic state opposite the first logic state.

3. The processor of claim 2, wherein said compressed instruction decoder comprises an N-to-1 multiplexer; and wherein the second select signal is a multi-bit select signal having a width equal to $\log_2 N$.

4. The processor of claim 1, wherein said compressed instruction decoder comprises an N-to-1 multiplexer; and wherein the second select signal is a multi-bit select signal having a width equal to $\log_2 N$.

5. The processor of claim 4, wherein said compressed instruction decoder comprises an 1-to-N demultiplexer having an input electrically coupled to an output of said N-to-1 multiplexer.

6. The processor of claim 5, wherein at least one output of said 1-to-N demultiplexer is electrically coupled to a row address decoder.

7. The processor of claim 5, wherein the input of said 1-to-N demultiplexer is electrically connected to the output of said N-to-1 multiplexer by a multi-bit bus; and wherein the 1-to-N demultiplexer has $\log_2 N$ select inputs that receive signals provided by the $\log_2 N$ most significant lines of the multi-bit bus.

8. A control method of operating a microcomputer system comprising the steps of:

fetching either an uncompressed normal instruction or a plurality of compressed instructions from an internal cache or an external memory of the microcomputer system;

determining current operation mode of the microcomputer system between a normal mode for processing the normal instruction and a compression mode for processing the compressed instructions;

inputting the fetched normal instruction to an instruction decoder of a processor core in the normal mode, and inputting the fetched compressed instructions to a compressed instruction decoder in the compression mode;

selecting one of the compressed instructions, and determining sort of the selected compressed instruction in the compression mode;

storing the selected compressed instruction to a first register if the sort of the selected compressed instruction is an operand for specifying an immediate field or a register;

reading out an instruction from a memory corresponding to the selected compressed instruction and storing the read out instruction to a second register, if the sort of the selected compressed instruction is not the operand, wherein the selected compressed instruction is used as an address to indicate the instruction of the memory;

determining whether the instruction stored in the second register requires the operand;

combining the instruction stored in the second register with the operand stored in the first register, and inputting the combined instruction to the instruction decoder of the processor core, if the instruction requires the operand; and inputting the instruction stored in the second register to the instruction decoder of the processor core, if the instruction does not require the operand.

9. The control method of microcomputer system according to claim 8, wherein the instructions stored in the memory are predetermined by selecting frequently used instructions through a stochastic method, or are predetermined by a user, selectively.

10. The control method of microcomputer system according to claim 8, wherein the memory stores a first type instructions being not required the operand, and a second type instructions being required the operand.

11. A method of operating a microcomputer systems, comprising the steps of:

fetching a plurality of compressed instructions from an internal cache or an external memory of the microcomputer system;

determining whether a current operation mode is a compression mode for processing the compressed instructions;

inputting one of the fetched compressed instructions to a compressed instruction decoder, if the determined current operation mode is the compression mode;

decoding the compressed instruction as an address of a memory array containing a plurality of instructions; and providing an instruction, which is stored at the address within the memory array, to an output of the compressed instruction decoder.

* * * * *